(12) United States Patent
Chowdhary et al.

(10) Patent No.: US 7,979,207 B2
(45) Date of Patent: Jul. 12, 2011

(54) SYSTEMS AND METHODS FOR DETECTING A VEHICLE STATIC CONDITION

(75) Inventors: Mahesh Chowdhary, San Jose, CA (US); Qiyue Zhang, Cupertino, CA (US); Mangesh Chansarkar, Irvine, CA (US); Gengsheng Zhang, Cupertino, CA (US)

(73) Assignee: SIRF Technology, Inc., San Jose, CA (US)

( * ) Notice: Subject to any disclaimer, the term of this patent is extended or adjusted under 35 U.S.C. 154(b) by 1149 days.

(21) Appl. No.: 11/687,782

(22) Filed: Mar. 19, 2007

(65) Prior Publication Data
US 2008/0234933 A1    Sep. 25, 2008

(51) Int. Cl.
*G01C 7/04* (2006.01)
(52) U.S. Cl. .......................... 701/213; 73/503
(58) Field of Classification Search ............. 701/1, 213, 701/217, 220, 221; 73/514.02, 1.79, 504.12, 73/1.77, 503.3, 503, 178 R, 504.04
See application file for complete search history.

(56) References Cited

U.S. PATENT DOCUMENTS

| | | | |
|---|---|---|---|
| 5,270,959 A * | 12/1993 | Matsuzaki et al. | 702/93 |
| 6,147,626 A * | 11/2000 | Sakakibara | 340/988 |
| 6,411,892 B1 | 6/2002 | Van Diggelen | |
| 6,417,801 B1 | 7/2002 | Van Diggelen | |
| 6,429,814 B1 | 8/2002 | Van Diggelen et al. | |
| 6,453,237 B1 | 9/2002 | Fuchs et al. | |
| 6,484,097 B2 | 11/2002 | Fuchs et al. | |
| 6,487,499 B1 | 11/2002 | Fuchs et al. | |
| 6,510,387 B2 | 1/2003 | van Diggelen | |
| 6,542,820 B2 | 4/2003 | LaMance et al. | |
| 6,560,534 B2 | 5/2003 | Abraham et al. | |
| 6,606,346 B2 | 8/2003 | Abraham et al. | |
| 6,704,651 B2 | 3/2004 | Van Diggelen | |
| 7,112,939 B2 * | 9/2006 | Lim et al. | 318/568.12 |
| 7,136,751 B2 * | 11/2006 | Pinto et al. | 701/215 |

* cited by examiner

*Primary Examiner* — Dalena Tran
(74) *Attorney, Agent, or Firm* — Thomas, Kayden, Horstemeyer & Risley, LLP

(57) ABSTRACT

Systems and methods for detecting a vehicle static condition are provided. In this regard, a representative system includes a sensor operative to detect at least one of acceleration and angular rate of a vehicle. The sensor is further operative to generate a vehicle vibration profile based on the at least one of the detected acceleration and angular rate of the vehicle. The system further includes a computing device operative to receive the vehicle vibration profile from the sensor, the computing device being further operative to determine whether the vehicle is stationary or moving based on the vehicle vibration profile. A representative method for detecting a vehicle static condition includes detecting at least one of acceleration and angular grade of a vehicle; generating a vehicle vibration profile based on at least one of the detected acceleration and angular grade of the vehicle; receiving the vehicle vibration profile; and determining whether the vehicle is stationary or moving based on the vehicle vibration profile.

29 Claims, 8 Drawing Sheets

US 7,979,207 B2

SYSTEMS AND METHODS FOR DETECTING A VEHICLE STATIC CONDITION

TECHNICAL FIELD

The present disclosure is generally related to signal processing and, more particularly, is related to systems and methods for detecting a vehicle static condition.

BACKGROUND

Typically, a global positioning system (GPS) can provide a user with a position, velocity, and time (PVT) solution, sometimes referred to as a navigation solution. The global positioning system includes a GPS receiver which typically incorporates current measurements from four or more satellites to update its most recent PVT solution. The GPS receiver can incorporate dead reckoning techniques that estimate a vehicle's acceleration to propagate the current PVT solution in-between measurement updates. Despite technological advances in the GPS area, the GPS receiver may not be able to receive GPS signals all the time. This is known as a GPS outage, which occurs when fewer than four valid satellite measurements are available at each update. For example, a GPS antenna mounted on top of an aircraft may only detect a limited number of satellites during a banked turn, and the dilution of precision parameters for that visible constellation may be unacceptably high. A vehicle passing through a tunnel may not detect any satellites for an extended period. During the GPS outage, the navigation solution becomes less accurate the longer the outage. Thus, a heretofore unaddressed need exists in the industry to address the aforementioned deficiencies and inadequacies.

SUMMARY

Systems and methods for detecting a vehicle static condition are provided. In this regard, a representative system includes a sensor operative to detect acceleration and/or angular rate (or rotation) of a vehicle. The sensor is further operative to generate a vehicle vibration profile based on the detected acceleration and/or angular rate of the vehicle. The system further includes a computing device operative to receive the vehicle vibration profile from the sensor, the computing device being further operative to determine whether the vehicle is stationary or moving based on the vehicle vibration profile.

A representative method for detecting a vehicle static condition includes detecting at least one of acceleration and angular rate of a vehicle; generating a vehicle vibration profile based on at least one of the detected acceleration and angular rate of the vehicle; receiving the vehicle vibration profile; and determining whether the vehicle is stationary or moving based on the vehicle vibration profile.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

Exemplary systems are first discussed with reference to the figures. Although these systems are described in detail, they are provided for purposes of illustration only and various modifications are feasible. After the exemplary systems are described, examples of flow diagrams of the systems are provided to explain the manner in which a vehicle is determined to be stationary.

Figure 1:
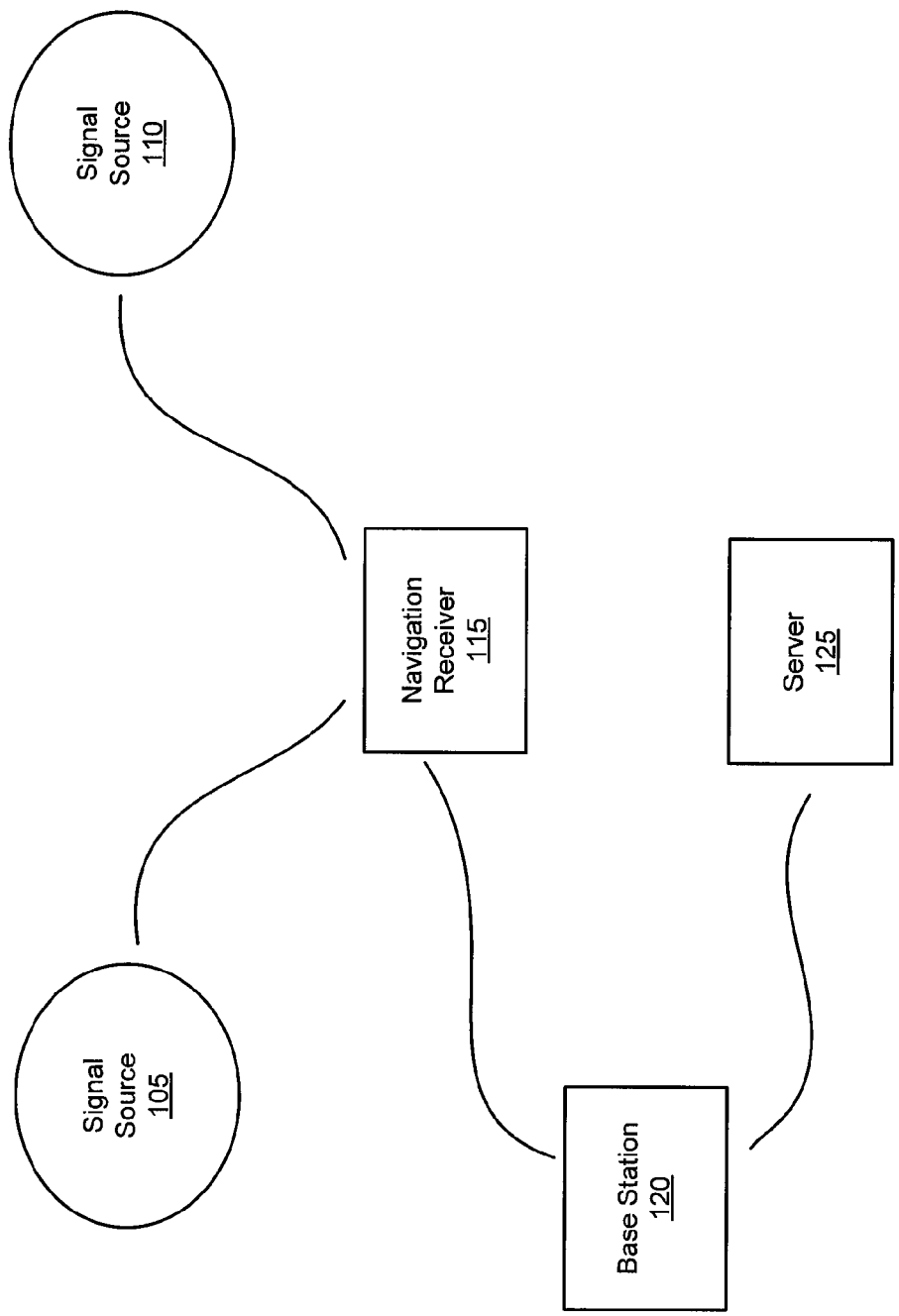
FIG. 1 is a block diagram that illustrates a system overview for determining a location of a navigation receiver.

FIG. 1 is a block diagram that illustrates a system overview for determining a location of a navigation receiver 115. A simple system 100 comprises a plurality of signal sources 105, 110 and a navigation receiver 115. Alternatively or additionally, a more complex system 100, such as an assisted global positioning system (GPS), further comprises a base station 120 and a server 125. Although only one navigation receiver 115, one base station 120, and one server 125 are shown in system 100, the system 100 can include multiple navigation receivers, multiple base stations and/or multiple servers. Alternatively or additionally, the server 125 may be co-located with the base station 120 or with the navigation receiver 115.

The signal sources 105, 110 include GPS satellites, among others. The signal sources 105, 110 generally orbit above the location of the receivers 115 at any given time. The navigation receivers 115 include, but are not limited to, GPS receivers, cell phones with embedded signal receivers, and Personal Digital Assistants (PDAs) with embedded signal receivers, among others. The signal sources 105, 110 transmit signals to the navigation receivers 115, which use the signals to determine the location, speed, and direction of the navigation receivers 115.

GPS signals from signal sources 105 are not always available. This is known as GPS outages. Because there are periods of GPS outages, data related to GPS velocity are not available at all times and are not reliable for detecting whether a vehicle is stationary, which is also known as a vehicle static condition. In general, GPS velocity is velocity determined by received GPS measurements. Consequently, there are several reasons for detecting a vehicle static condition. When the vehicle is stationary, the navigation receiver 115 can calculate the roll and pitch angles of the vehicle from data received by sensors (not shown in FIG. 1, but later shown in FIGS. 2 and 3). The calculated roll and pitch angles of the vehicle can be transmitted to an Extended Kalman Filter (EKF) in the navigation receiver 115, the calculated data of which improve the accuracy of the navigational estimation calculated by the EKF during periods of GPS outages. In addition, if an attitude initialization cannot be obtained from memory of the navigation receiver 115, static alignment process calculations can be used for attitude initialization of the EKF, if the vehicle is stationary.

Detecting the vehicle static condition can trigger the navigation receiver 115 to utilize gyro measurements as gyro bias values. If the value of gyro bias is provided for EKF initialization, the time required for convergence of the EKF can be substantially reduced. In addition, the navigation receiver 115 can estimate a combination of accelerometer biases if the vehicle static condition is detected.

Measurement data from GPS contains information related to the position (X, Y, and Z) and Velocity (Vx, Vy, and Vz) of a vehicle. If the system determines that the vehicle is stationary, the values of all three components of velocity vector can be set to zero for measurement update of the Kalman filter. The uncertainty associated with each of these measurement values is lower since a static detection algorithm can confirm that the vehicle is stationary. An exemplary static detection algorithm is described in detail in relation to FIG. 6.

When the vehicle static condition is detected, the heading of the vehicle can be frozen and its velocity can be set to zero and the navigation receiver 115 can continue using data related to the vehicle's position based on a previously computed position. In addition, the navigation receiver 115 can calculate the zero velocity update, which accelerates the convergence of the EFK and the estimation of inertial sensor parameters.

Figure 2:
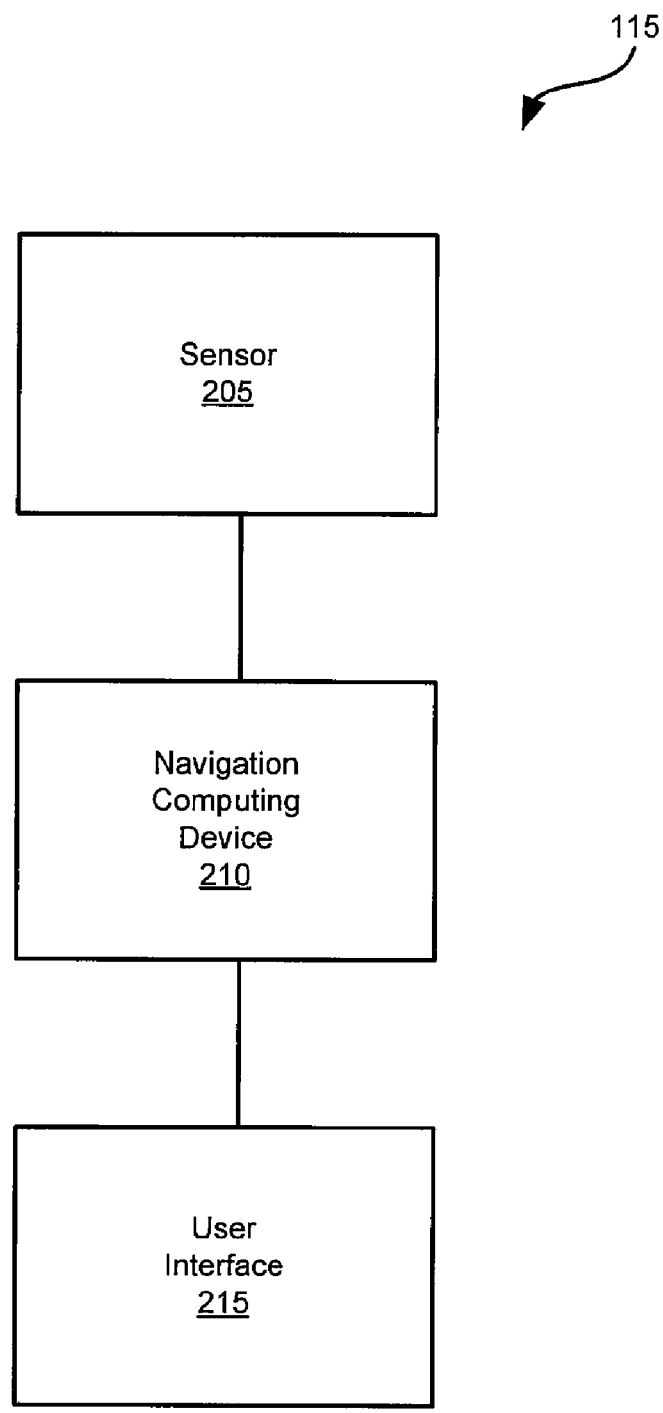
FIG. 2 is a block diagram that illustrates an embodiment of subsystems of a navigation receiver, such as that shown in FIG. 1.

FIG. 2 is a block diagram that illustrates an embodiment of subsystems of a navigation receiver 115, such as that shown in FIG. 1. The navigation receiver 115 includes sensor(s) 205 and a navigation computing device 210. The sensor 205 can include, but is not limited to, inertial sensors that include, for example, micro-electromechanical system (MEMS) sensors, such as, for example, accelerometers and gyroscopes, among others. In general, accelerometers measure acceleration of their own motion. The accelerometer detects specific force which includes gravity and vehicle acceleration. Gyroscope measures orientation or angular rate based on the principle of conservation of angular momentum and detection Coriolis acceleration. The gyroscope detects the angular rate of turn for the defined axis (roll, pitch or heading). In general, the sensor 205 can detect the difference between the moving and stationary vibrations of a vehicle. In particular, the sensor 205 can detect the acceleration and/or the angular rate of the vehicle and generate a vehicle vibration profile based on the detected acceleration and/or the detected angular rate.

Various combinations of accelerometer measurement data, gyroscope measurement data, and GPS velocity data can be used to determine if the vehicle is stationary at any particular instance. The various combinations can further reduce the probability of false detection (Pfd) to nearly zero percent and keep the probability of detection (Pd) close to 100%. The probability of false detection (Pfd) is defined as the probability of events that the algorithm declares that the vehicle is in static condition when the vehicle is actually moving. The Pd is the probability of the event that the algorithm declares the static condition when the vehicle is actually stationary.

The navigation computing device 210 can include, but is not limited to, a GPS receiver, among others. The navigation receiver 115 can utilize the sensors 205 and the GPS receiver to sense movement of the vehicle. The navigation computing device 210 can use data generated by the sensors 205 in dead reckoning calculations to produce positioning information during periods of GPS outages. The positioning information includes data related to the position, velocity, and attitude of a vehicle. In general, dead reckoning refers to a process of calculating location by integrating measured increments of distance and direction of travel relative to a known location. The navigation computing device 210 can further include an extended Kalman filter (EKF), which estimates position, velocity, attitude, and accelerometer and gyro errors in three dimensions, such as, for example, the position (X, Y, and Z) and velocity (Vx, Vy, and Vz) of the vehicle, among others. The estimated information is passed to a user interface 215 that provides a user with navigational information.

Figure 3:
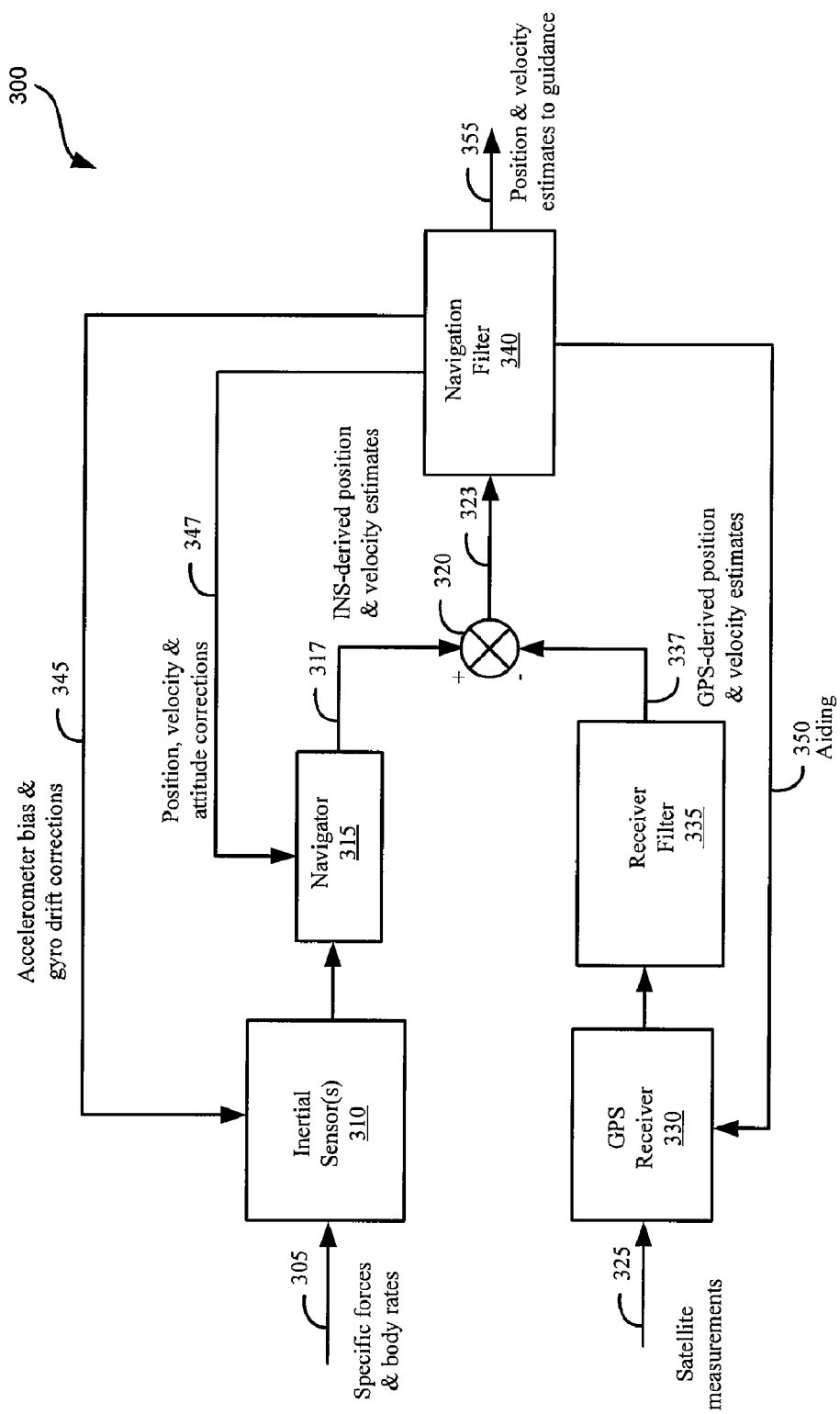
FIG. 3 is a block diagram that illustrates an embodiment of a navigation receiver, such as that shown in FIG. 1.

FIG. 3 is a block diagram that illustrates an embodiment of a navigation receiver, such as that shown in FIG. 1. The navigation receiver 300 includes inertial sensors 310 operative to detect specific forces and body rates 305. The inertial sensor 310 includes, but is not limited to, micro-electromechanical systems (MEMS) accelerometer, geophones and gyros, among others. The inertial sensors 310 transmit data related to the detected specific forces and body rates 305 to a navigator 315, which estimates an inertial navigational system (INS)-derived position and velocity of a vehicle based on the transmitted data. The navigator 315 transmits data 317 related to the estimated INS-derived position and velocity to a mixer 320.

Satellite measurements 325 are received by a GPS receiver 330, which transmits data related to the satellite measurements 325 to a receiver filter 335. The receiver filter 335 includes, but is not limited to, a GPS receiver Kalman filter, among others. The filter 335 estimates a GPS-derived position and velocity of the vehicle based on the satellite measurements 325, and transmits the estimated data 337 to the mixer 320. The mixer 320 mixes the data 317, 337 related to both the INS and GPS-derived positions and velocities, and transmits the mixed data 323 to a navigation filter 340.

The navigation filter 340 can include, but not limited to, a navigation Kalman filter, among others. The navigation filter 340 can generate and transmit feedback information relating to an accelerometer and gyro drift correction 345; position, velocity, and attitude corrections 347; and aiding information 350 to the inertial sensors 310, the navigator 315, and the GPS receiver 330, respectively. The inertial sensor 310 can use the information related to accelerometer and gyro drift correction for calibration of the inertial sensor 310, leading to better inertial measurement. The navigator 315 can use the information related to position, velocity, and attitude corrections for more accurate positioning, velocity, and attitude calculations.

Inertial sensor data can be used to aid the satellite signal acquisition process. The GPS receiver 330 can include code-tracking loops that can be provided with inertial sensor information to improve the ability of the GPS receiver 330 to track signals in noisy environment. Additionally, if the inertial sensors 310 detect that the vehicle is stationary, measurement updates for the GPS Kalman filter 335 can utilize information relating to the vehicle static condition to improve a measurement process noise model. The navigation filter 340 generates data 355 related to position and velocity estimates to guidance based on the mixed data 323.

Figure 4:
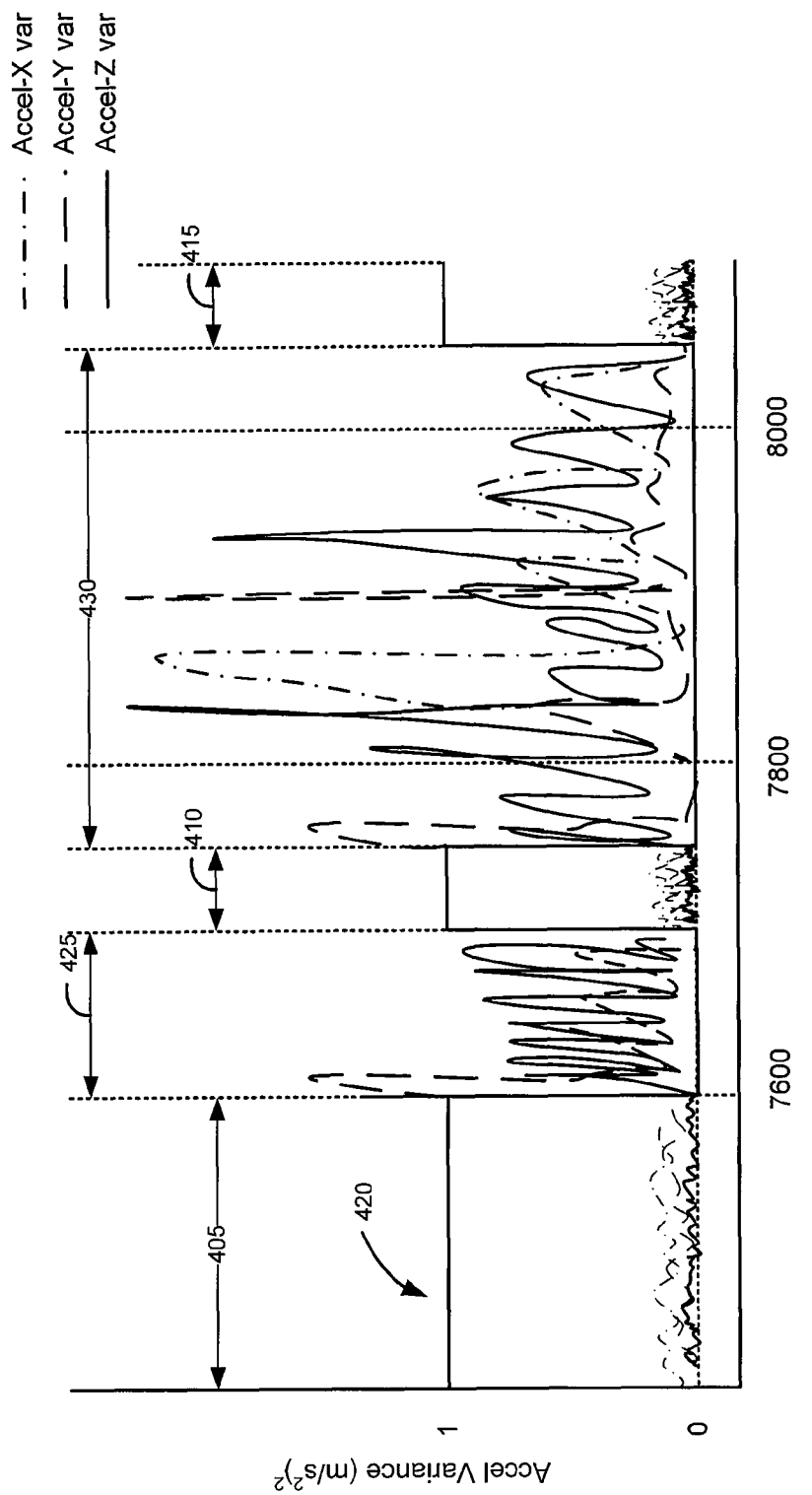
FIG. 4 is a graph illustrating variances of accelerometer signals for a data set collected.

FIG. 4 is a graph illustrating variances of accelerometer signals for a data set collected. When the vehicle is stationary, the gravity component and the accelerometer bias can be constant values during a detection window of, for example, 1-2 seconds. The detection window is generally chosen to be as short as possible to quickly detect the static state after the vehicle comes to rest. However, the detection window is long enough to detect changes caused by the vehicle's motion. A moving window of, for example, two (2) seconds with, for example, a one (1) second step is used to detect the start of the vehicle's movement. In other words, the vehicle can be detected to be stationary within two (2) seconds after the vehicle comes to rest and the vehicle can be detected to be moving within one (1) second after the vehicle moves.

The accelerometer bias can vary with time and/or due to temperature changes. But this change related to the accelerometer bias is generally on a time scale of tens of minutes. Peak-to-peak variation in accelerometer measurement and the standard deviation of the measurement within the detection window are used to detect the difference between a vehicle static condition and a vehicle moving condition. Gyroscope measurement signal can be used along with the accelerometer measurements to reduce the probability of false detection.

Peak-to-peak variation on accelerometer and gyroscope signals (uncompensated) when compared against thresholds derived from sensor noise characteristics and vehicle vibration characteristics are used to determine if the vehicle is stationary. The peak-to-peak variations in accelerometer and gyroscope signals are generally observed within the detection window. In general, the detection window is a moving window that varies from 1 second to a few seconds. Static condition detection is further improved by monitoring the variances of accelerometer measurements for all three axes along with peak-to-peak gyroscope measurements. Variance of the accelerometer signal equates to noise power in acceleration data. The variance of accelerometer signal for a condition when the vehicle is either accelerating or when it is moving with constant speed is much higher than the case when the vehicle is stationary.

As shown in FIG. 4, the vehicle static conditions are detected at detection windows 405, 410, 415 having the variances of the accelerometer signal for the three axes below a threshold 420 of, for example, one $(m/s^2)^2$. The threshold 420 is also used as a detection logic indicating vehicle static condition. The variance of accelerometer signal for the three axes increase above the threshold of one $(m/s^2)^2$ at detection windows 425, 430. This yields zero $(m/s^2)^2$, which can be used as a detection logic to indicate that the vehicle is moving. Since the gyro noise level (not shown) is generally very small compared to its resolution (one or two analog to digital conversion (ADC) bits), the standard deviation of the gyro output is not used for static detection purpose. However, if higher resolution gyros are available, the variance of the gyro output can also be used for the vehicle static condition detection.

Figure 5:
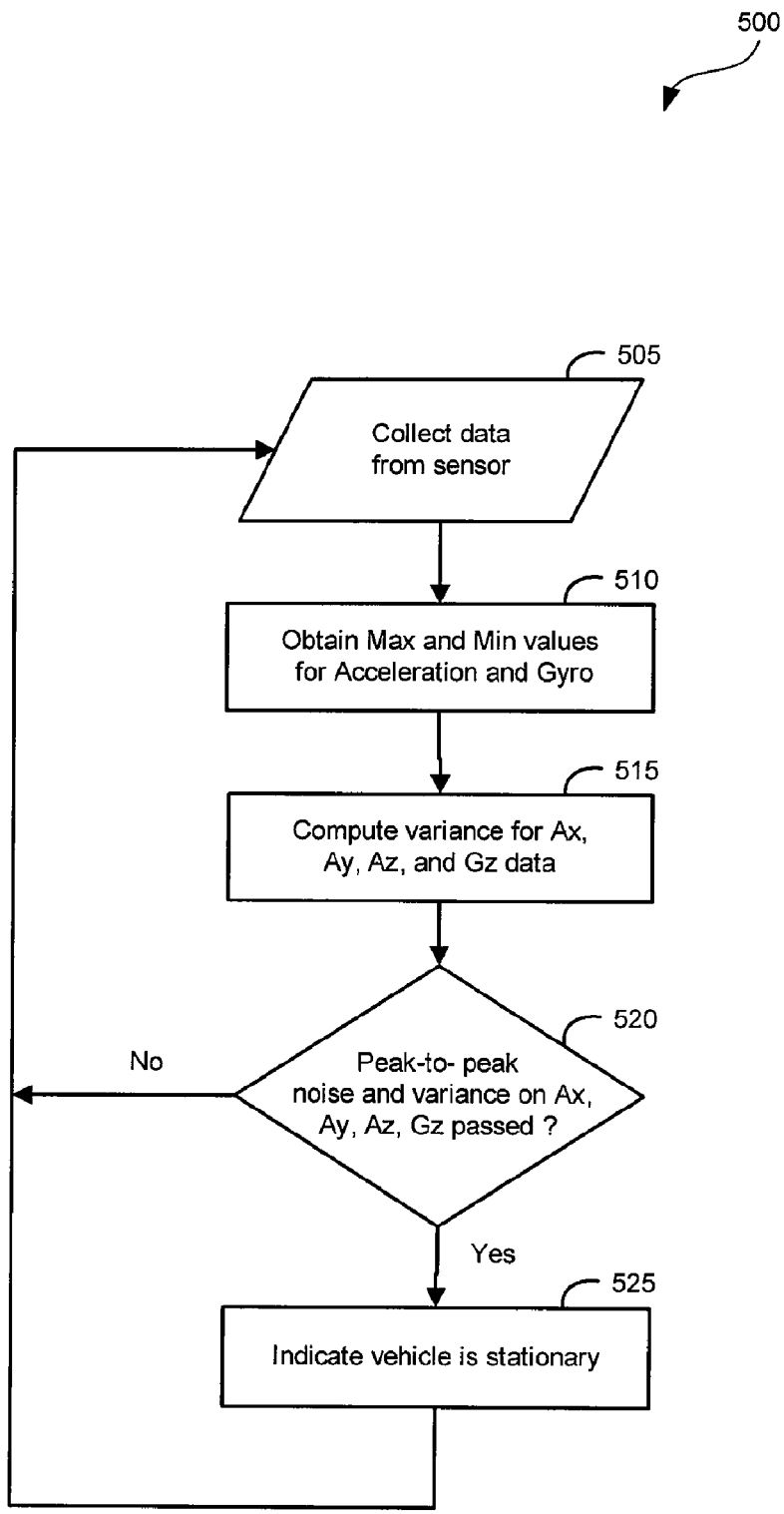
FIG. 5 is a flow diagram that illustrates an embodiment of a method for detecting a vehicle static condition.

FIG. 5 is a flow diagram that illustrates an embodiment of a method 500 for detecting a vehicle static condition. Beginning with step 505, the method 500 collects data from a sensor or multiple sensors. Step 510 obtains maximum values and minimum values corresponding to, for example, but not limited to, acceleration in the X, Y, and Z coordinates, and gyro of a vehicle. Step 515 computes the variance of the values related to the acceleration and gyro of the vehicle.

Step 520 determines whether peak-to-peak noise and/or variance of the values pass certain thresholds related to the acceleration and/or gyro of the vehicle. If the thresholds have been passed, step 525 indicates that the vehicle is stationary. If the thresholds have not been passed, the process 500 continues to collect data from the sensor as indicated in step 505. The indication for vehicle static condition includes, but is not limited to, generating a logical flag, a message data, and/or an alarm data, among others. In general, data is collected from the sensor on a regular basis, such as, for example, every tenth of a second, every second, and every minute, among others. Alternatively or additionally, the data can be collected from the sensor when the vehicle is braking, accelerating, and/or not accelerating.

Figure 6:
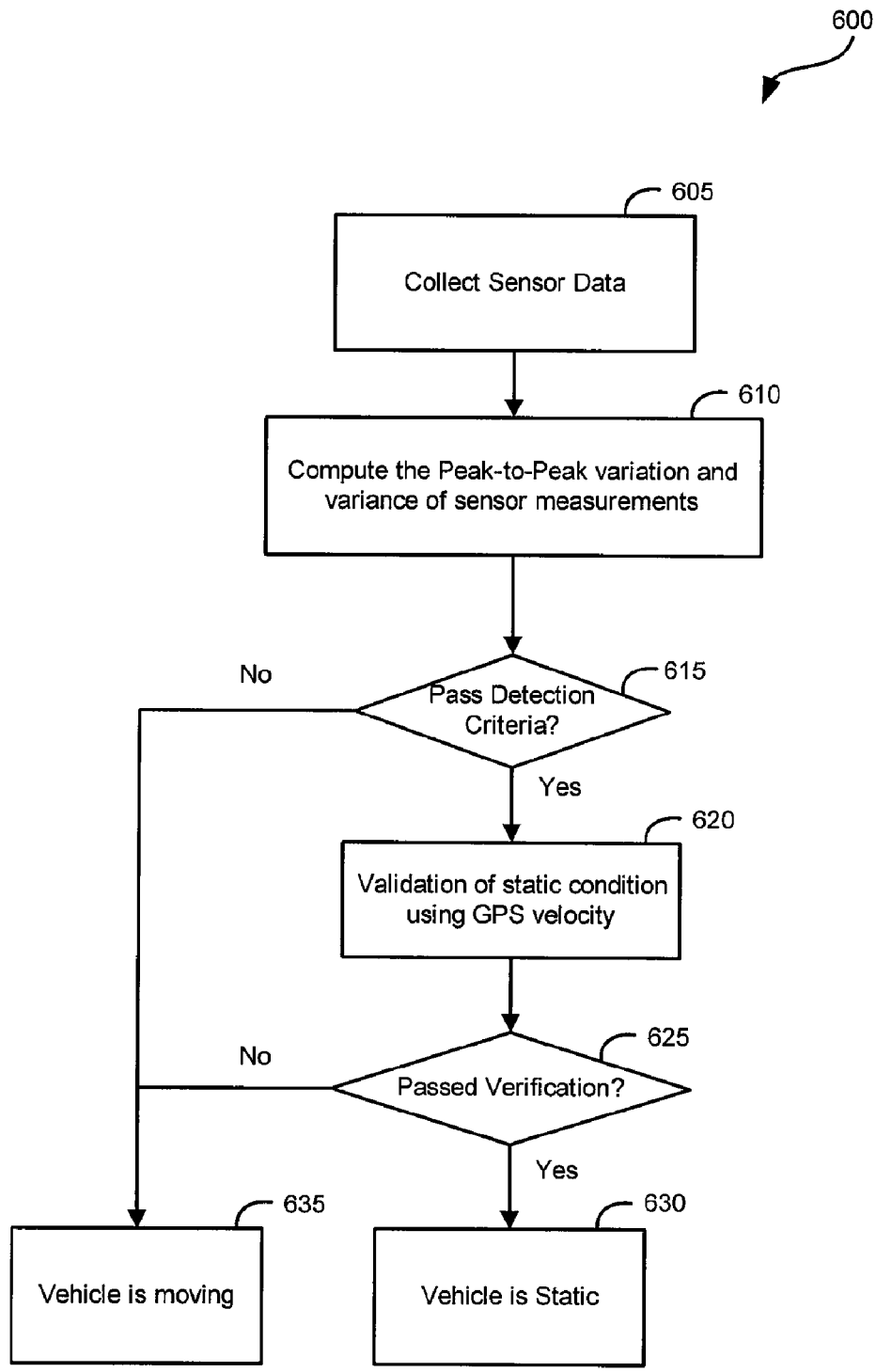
FIG. 6 is a flow diagram that illustrates another embodiment of a method for detecting a vehicle static condition.

FIG. 6 is a flow diagram that illustrates an embodiment of a method 600 for detecting a vehicle static condition. Beginning with step 605, inertial sensors detect and collect inertial measurements when the vehicle is stationary. Step 610 computes peak-to-peak variation and variance of sensor measurements, such as that described in relation to FIG. 4. Step 615 determines whether the computed peak-to-peak variation and/or variance of sensor measurements pass detection criteria. In general, the detection criteria include, but are not limited to, an acceleration threshold, an angular rate threshold, and/or an acceleration noise power threshold, among others.

The criteria for static condition detection can be expressed as a logical combination of each of the inertial measurements, as described by the pseudo code below:

```
If (
        ((max_diff_Accel_x < acc_diff_threshold) &&
            (max_diff_Accel_y < acc_diff_threshold) &&
            (max_diff_Accel_z < acc_diff_threshold) &&
            (max_diff_gyro < gyro_dfff_threshold))
    ||
        ((var_Acc_x < Horizontal Accel Noise Power) &&
            (var_Acc_y < Horizontal Accel Noise Power) &&
            (var_Acc_z < Vertical Accel Noise Power))
)
{
        Vehicle is in Static State
}
else
{
        Vehicle is moving
}
```

The "max_diff" means the maximum difference between maximum peak value and the minimum peak value within a detection window time period. "Var" denotes the variance within the detection window. The logic symbol '&&" means the logical AND, and the "||" means the logical OR. Alternatively or additionally, the logical OR expressed in the pseudo code can be replaced with the logical AND.

Another example, among others, of a criteria for static condition detection is as follows. The accelerometer measurement signals for three axes, such as, for example, roll, pitch, and heading, can include, but are not limited to, engine vibration (if engine is ON), accelerometer bias, gravity component and measurement noise, among others. If accelerometer biases for all the three axes are known, the Euclidean norm of the acceleration measured can be compared along the three axes. The compared Euclidean norm is compared against the gravitational acceleration and sensor measurement noise, yielding information on the vehicle static condition. In other words, if the Euclidean norm of compensated acceleration signals from all three axes is less than the sum of gravitational acceleration (9.8 m/sec$^2$) and sensor noise threshold, then the vehicle is determined to be stationary. This can be explained by way of an equation as shown below:

$$\sqrt{A_x^2 + A_y^2 + A_z^2} < 9.818 + \delta$$

If the value of accelerometer bias for all three axes is not known precisely, then this method becomes potentially unreliable in detecting the static condition.

If the detection criteria are not met, step 635 determines that the vehicle is moving. If the vehicle is moving at a constant velocity within a static detection window, the effectiveness of the inertial sensors to detect the vehicle static condition can be reduced. Thus, in order to avoid false detection of static conditions, global positioning system (GPS) velocity is used to validate the detection. Thus, if the detection criteria are met, step 620 validates whether the vehicle is stationary using data related to GPS velocity. Step 625 determines whether the data related to the GPS velocity verifies that the computed peak-to-peak variation and variance of sensor measurements passed the detection criteria. If the verification is met, step 630 determines that the vehicle is stationary. If the verification is not met, step 635 determines that the vehicle is moving.

Figure 7:
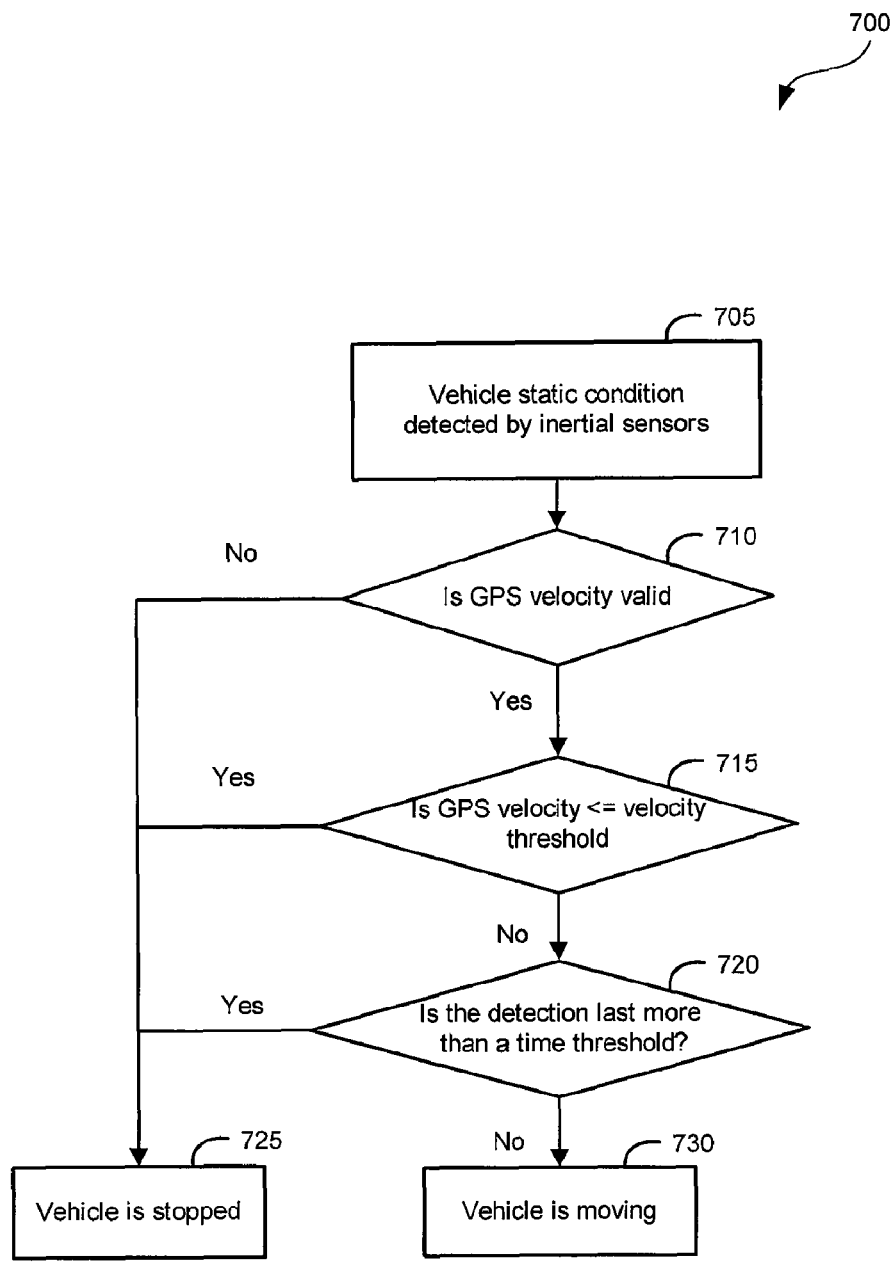
FIG. 7 is a flow diagram that illustrates another embodiment of a method for detecting a vehicle static condition.

FIG. 7 is a flow diagram that illustrates another embodiment of a method 700 for detecting a vehicle static condition. Beginning with step 705, a vehicle static condition is detected by inertial sensors. Step 710 determines whether data related to GPS velocity of a vehicle is valid. If the GPS velocity is determined not to be valid, the vehicle is determined stationary as indicated in step 725. If the GPS velocity is determined to be valid, step 715 compares whether the GPS velocity is less than or equal to a threshold of, for example, one meter per second. If the GPS velocity is determined to be less than or equal to the threshold, the vehicle is determined to be stationary as indicated in step 725. If the GPS velocity is determined not to be less than or equal to the threshold, step 720 determines whether the vehicle static condition detected by the inertial sensors as mentioned at step 705 has a detection window that last for more than a desired time period, such as, for example, three (3) seconds. If the vehicle static condition is determined to last more than the predefined time period, the vehicle is determined stationary as indicated in step 725. If the vehicle static condition is determined not to last more than the predefined time period, the vehicle is determined to be moving as indicated in step 730.

The method 700 includes a GPS velocity delay and large GPS velocity errors which can be caused by multi-path signals so that the "valid" GPS velocity can be used to invalidate a false static state detection if, for example, the inertial sensor detected the vehicle static condition for less than 3 seconds and the GPS velocity is greater than 1 m/s. If the inertial sensor detects the vehicle static condition for a time period of more than 3 seconds, the vehicle static condition can be determined.

Figure 8:
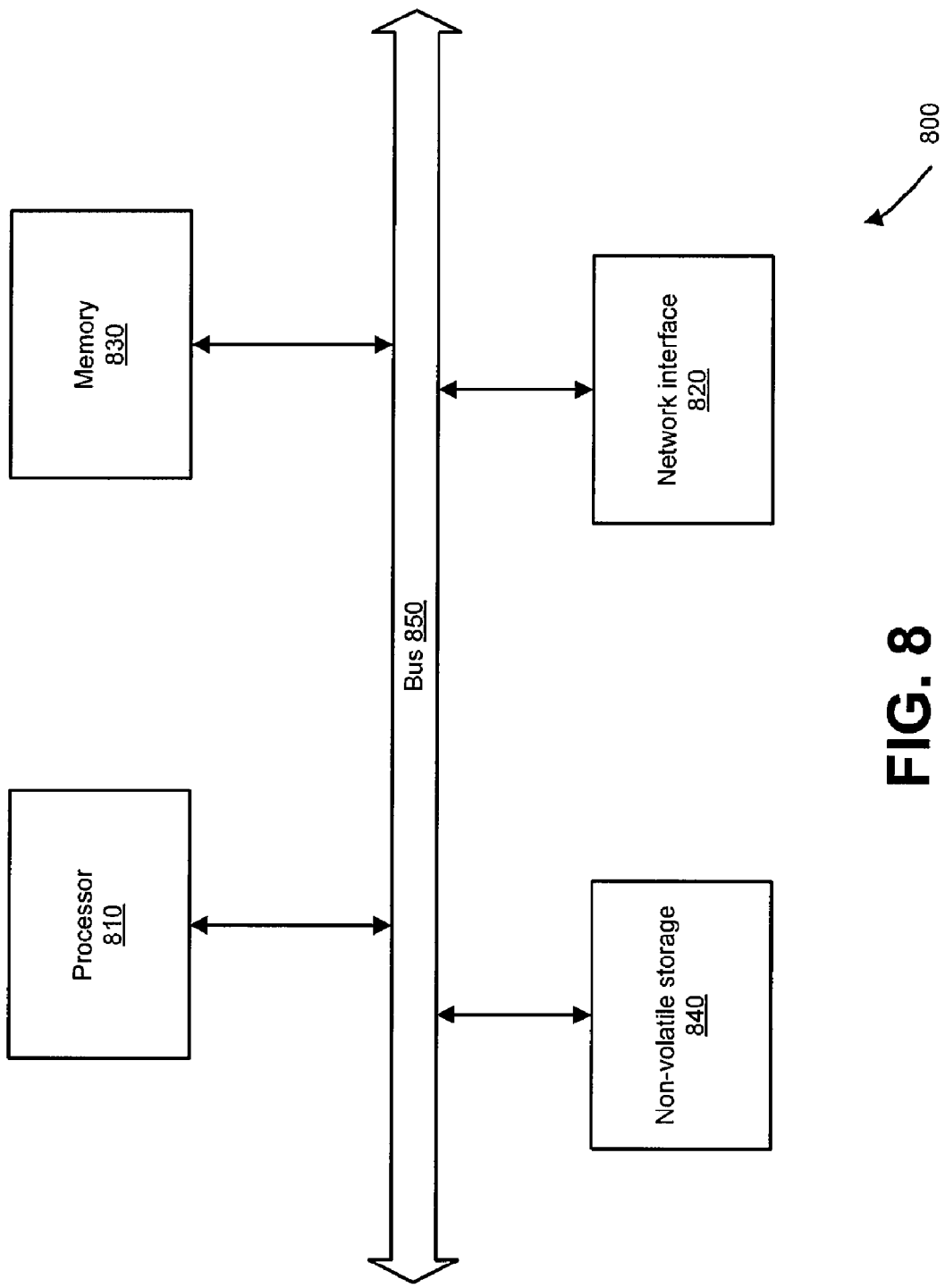
FIG. 8 is a hardware block diagram of a general-purpose computing device that can be used to implement one or more of the components of a navigation receiver, such as that shown in FIGS. 2 and 3.

FIG. 8 is a hardware block diagram of a general-purpose computing device 800 that can be used to implement one or more of the components of a navigation receiver, such as that shown in FIGS. 2 and 3. The computing device 800 contains a number of components that are well known in the art of GPS, including a processor 810, a network interface 820, memory 830, and non-volatile storage 840. Examples of non-volatile storage include, for example, a hard disk, flash RAM, flash ROM, EEPROM, etc. These components are coupled via a bus 850. The memory 830 contains instructions which, when executed by the processor 810, implement at least a portion of the methods and systems disclosed herein. Omitted from FIG. 8 are a number of conventional components, known to those skilled in the art that are unnecessary to explain the operation of the device 800.

The systems and methods disclosed herein can be implemented in software, hardware, or a combination thereof. In some embodiments, the system and/or method is implemented in software that is stored in a memory and that is executed by a suitable microprocessor (μP) situated in a computing device. However, the systems and methods can be embodied in any computer-readable medium for use by or in connection with an instruction execution system, apparatus, or device. Such instruction execution systems include any computer-based system, processor-containing system, or other system that can fetch and execute the instructions from the instruction execution system. In the context of this disclosure, a "computer-readable medium" can be any means that can contain, store, communicate, propagate, or transport the program for use by, or in connection with, the instruction execution system. The computer readable medium can be, for example, but not limited to, a system or propagation medium that is based on electronic, magnetic, optical, electromagnetic, infrared, or semiconductor technology.

Specific examples of a computer-readable medium using electronic technology would include (but are not limited to) the following: an electrical connection (electronic) having one or more wires; a random access memory (RAM); a read-only memory (ROM); an erasable programmable read-only memory (EPROM or Flash memory). A specific example using magnetic technology includes (but is not limited to) a portable computer diskette. Specific examples using optical technology include (but are not limited to) optical fiber and compact disc read-only memory (CD-ROM).

Note that the computer-readable medium could even be paper or another suitable medium on which the program is printed. Using such a medium, the program can be electronically captured (using, for instance, optical scanning of the paper or other medium), compiled, interpreted or otherwise processed in a suitable manner, and then stored in a computer memory. In addition, the scope of the certain embodiments of the present disclosure includes embodying the functionality of the preferred embodiments of the present disclosure in logic embodied in hardware or software-configured mediums.

It should be noted that any process descriptions or blocks in flowcharts should be understood as representing modules, segments, or portions of code which include one or more executable instructions for implementing specific logical functions or steps in the process. As would be understood by those of ordinary skill in the art of the software development, alternate embodiments are also included within the scope of the disclosure. In these alternate embodiments, functions may be executed out of order from that shown or discussed, including substantially concurrently or in reverse order, depending on the functionality involved.

This description has been presented for purposes of illustration and description. It is not intended to be exhaustive or to limit the disclosure to the precise forms disclosed. Obvious modifications or variations are possible in light of the above teachings. The embodiments discussed, however, were chosen to illustrate the principles of the disclosure, and its practical application. The disclosure is thus intended to enable one of ordinary skill in the art to use the disclosure, in various embodiments and with various modifications, as are suited to the particular use contemplated. All such modifications and variation are within the scope of this disclosure, as determined by the appended claims when interpreted in accordance with the breadth to which they are fairly and legally entitled.

Therefore, having thus described the disclosure, at least the following is claimed:

1. A navigation system comprising:
   a sensor operative to detect at least one of acceleration and angular rate of a vehicle, the sensor being operative to generate a vehicle vibration profile based on the at least one of the detected acceleration and angular rate of the vehicle, wherein the vehicle vibration profile comprises comparing at least one of a peak-to-peak variation and a standard deviation of the detected data; and a computing device operative to receive the vehicle vibration profile from the sensor, the computing device being operative to determine whether the vehicle is stationary or moving based on the vehicle vibration profile.

2. The navigation system as defined in claim 1, wherein the computing device is further operative to process the vehicle vibration profile using dead-reckoning techniques to determine the vehicle's position.

3. The navigation system as defined in claim 1, wherein the computing device is further operative to determine whether the vehicle is stationary or moving without calibration data related to the sensor.

4. The navigation system as defined in claim 3, wherein the calibration data related to the sensor includes sensor bias data and sensor scale factor data.

5. The navigation system as defined in claim 1, wherein the computing device is further operative to:
receive data detected by the sensor,
generate peak-to-peak variation in the acceleration and/or angular rate of the vehicle based on the detected data, and
determine whether the vehicle is stationary or moving based on the peak-to-peak variation.

6. The navigation system as defined in claim 5, wherein the computing device is further operative to:
determine whether the generated peak-to-peak variation is less than a threshold, and
responsive to determining that the peak-to-peak variation is less than the threshold, indicate that the vehicle is stationary.

7. The navigation system as defined in claim 6, wherein the computing device is further operative to:
responsive to detecting that the vehicle is stationary based on the peak-to-peak variation, determine whether the detection last more than a time threshold, and
responsive to determining that the detection last more than the time threshold, indicate that the vehicle is stationary.

8. The navigation system as defined in claim 1, wherein the computing device is further operative to:
validate whether the vehicle is stationary using global positioning system (GPS) velocity, and
responsive to validating that the vehicle is stationary, indicate that the vehicle is stationary.

9. The navigation system as defined in claim 8, wherein the computing device is further operative to:
determine whether the GPS velocity is less than or equal to a velocity threshold, and
responsive to determining that the GPS velocity is less than the velocity threshold, indicate that the vehicle is stationary.

10. The navigation system as defined in claim 1, wherein the computing device is further operative to:
receive data detected by the sensor,
generate standard deviation based on the detected data related to the acceleration of the vehicle,
determine whether the generated standard deviation is less than a threshold, and
responsive to determining that the generated standard deviation is less than the threshold, indicate that the vehicle is stationary.

11. The navigation system as defined in claim 1, wherein the computing device includes a GPS receiver and a navigation filter, the GPS receiver being operative to receive and transmit GPS signals to the navigation filter, the navigation filter being operative to process information related to the vehicle vibration profile based on the GPS signals.

12. The navigation system as defined in claim 11, wherein the GPS receiver is further operative to generate data related to a velocity of the vehicle based on the GPS signals, the GPS receiver being further operative to transmit the velocity data to the navigation filter, the navigation filter being further operative to determine whether the vehicle is stationary or moving based on the velocity data.

13. The navigation system as defined in claim 1, wherein the computing device is further operative to generate data relating to at least one of position, velocity, and attitude of the vehicle based on the data generated by the sensor, the data including the vehicle vibration profile.

14. A method for detecting a vehicle static condition, comprising:
detecting at least one of acceleration and angular rate of a vehicle;
generating a vehicle vibration profile based on at least one of the detected acceleration and angular rate of the vehicle by comparing at least one of a peak-to-peak variation and a standard deviation of the detected data; and
determining whether the vehicle is stationary or moving based on the vehicle vibration profile.

15. The method as defined in claim 14, further comprising:
receiving data detected by a sensor;
generating peak-to-peak variation in acceleration and angular rate of the vehicle based on the detected data; and
determining whether the vehicle is stationary or moving based on the peak-to-peak variation.

16. The method as defined in claim 15, further comprising:
determining whether the generated peak-to-peak variation is less than a threshold; and
responsive to determining that the peak-to-peak variation is less than the threshold, indicating that the vehicle is stationary.

17. The method as defined in claim 16, further comprising:
responsive to detecting that the vehicle is stationary based on the peak-to-peak variation, determining whether the detection last more than a time threshold; and
responsive to determining that the detection last more than the time threshold, indicating that the vehicle is stationary.

18. The method as defined in claim 14, further comprising:
receiving data detected by a sensor;
generating standard deviation based on the detected data related to the acceleration of the vehicle;
determining whether the generated standard deviation is less than a threshold; and
responsive to determining that the generated standard deviation is less than the threshold, indicating that the vehicle is stationary.

19. The method as defined in claim 14, further comprising:
validating whether the vehicle is stationary using GPS velocity; and
responsive to validating that the vehicle is stationary, indicating that the vehicle is stationary.

20. The method as defined in claim 19, further comprising:
determining whether the GPS velocity is less than or equal to a velocity threshold; and
responsive to determining that the GPS velocity is less than the velocity threshold, indicating that the vehicle is stationary.

21. The method as defined in claim 14, further comprising generating data relating to at least one of position, velocity, and attitude of the vehicle based on the data generated by a sensor, the data including the vehicle vibration profile.

22. A navigation system comprising:
a sensor operative to detect at least one of acceleration and angular rate of a vehicle; and
a computing device operative to:
receive data related to at least one of the detected acceleration and angular rate from the sensor,
generate peak-to-peak variation related to at least one of the detected acceleration and angular rate, and
determine whether the vehicle is stationary or moving based on the peak-to-peak variation.

23. The navigation system as defined in claim 22, wherein the computing device is further operative to:
validate whether the vehicle is stationary using GPS velocity, and
responsive to validating that the vehicle is stationary, indicate that the vehicle is stationary.

24. The navigation system as defined in claim 22, wherein the computing device is further operative to:
generate standard deviation based on the received data related to the detected acceleration,
determine whether the generated standard deviation is less than a threshold, and
responsive to determining that the generated standard deviation is less than the threshold, indicate that the vehicle is stationary.

25. A navigation system comprising:
means for detecting at least one of an acceleration and an angular rate of a vehicle;
means for generating a vehicle vibration profile based on the detected data by comparing at least one of a peak-to-peak variation and a standard deviation of the detected data; and
means for determining whether the vehicle is stationary based at least in part on the vehicle vibration profile.

26. The navigation system of claim 25, wherein the vehicle is determined to be stationary when the peak-to-peak variation of the detected data is less than a threshold level.

27. The navigation system of 25, further comprising means for validating whether the vehicle is stationary using a global positioning system velocity, wherein the vehicle is determined to be stationary if the global positioning system velocity is less than a threshold level.

28. The navigation system of 25, wherein the vehicle is determined to be stationary when the standard deviation of the detected data is less than a threshold level.

29. The navigation system of 25, further comprising a GPS receiver and a navigation filter.

* * * * *

UNITED STATES PATENT AND TRADEMARK OFFICE
CERTIFICATE OF CORRECTION

| | | |
|---|---|---|
| PATENT NO. | : 7,979,207 B2 | Page 1 of 1 |
| APPLICATION NO. | : 11/687782 | |
| DATED | : July 12, 2011 | |
| INVENTOR(S) | : Chowdhary et al. | |

It is certified that error appears in the above-identified patent and that said Letters Patent is hereby corrected as shown below:

Column 2, line 58, add "a" after the word "as"

Column 2, line 58, delete "outages" and replace with "outage"

Column 2, line 62, add "a" after the word "is"

Column 3, line 3, delete "of which" and replace with "may"

Column 3, line 46, delete "include" and replace with "includes"

Column 3, line 27, add a "." after the word "zero"

Column 3, line 28, delete "and"

Column 3, line 28, delete "the" and add "The"

Column 3, line 61, add "a" before the word "static"

Column 5, line 37, delete "variances" and replace with "variance"

Column 5, line 41, delete "increases" and replace with "increase"

Column 7, line 25, add a "," before the word "as"

Signed and Sealed this
Twenty-fifth Day of October, 2011

David J. Kappos
*Director of the United States Patent and Trademark Office*